US012214771B2

(12) United States Patent
Li et al.

(10) Patent No.: US 12,214,771 B2
(45) Date of Patent: Feb. 4, 2025

(54) ENGINE CONTROL METHOD, SYSTEM, AND VEHICLE (71) Applicant: Great Wall Motor Company Limited, Baoding (CN)

(72) Inventors: Yunfei Li, Baoding (CN); Qilin Chen, Baoding (CN)

(73) Assignee: Great Wall Motor Company Limited, Hebei (CN)

( * ) Notice: Subject to any disclaimer, the term of this patent is extended or adjusted under 35 U.S.C. 154(b) by 387 days.

(21) Appl. No.: 17/765,412

(22) PCT Filed: Nov. 23, 2020

(86) PCT No.: PCT/CN2020/130890
§ 371 (c)(1),
(2) Date: Mar. 30, 2022

(87) PCT Pub. No.: WO2021/115110
PCT Pub. Date: Jun. 17, 2021

(65) Prior Publication Data
US 2022/0355784 A1 Nov. 10, 2022

(30) Foreign Application Priority Data
Dec. 12, 2019 (CN) .......................... 201911276800.5

(51) Int. Cl.
*B60W 20/11* (2016.01)
*B60W 10/06* (2006.01)
(Continued)

(52) U.S. Cl.
CPC ............ *B60W 20/11* (2016.01); *B60W 10/06* (2013.01); *B60W 10/26* (2013.01); *B60W 20/13* (2016.01);
(Continued)

(58) Field of Classification Search
CPC ...... B60W 20/11; B60W 10/06; B60W 10/26; B60W 20/13; B60W 2510/086;
(Continued)

(56) References Cited

U.S. PATENT DOCUMENTS 6,393,361 B1 * 5/2002 Yano ........................ B60T 7/14
340/436
10,442,424 B2 10/2019 Hokoi et al.
(Continued)

FOREIGN PATENT DOCUMENTS

CN 103303301 9/2013
CN 103786719 5/2014
(Continued)

OTHER PUBLICATIONS

WIPO, International Search Report for PCT/CN2020/130890, Mar. 1, 2021.
(Continued)

*Primary Examiner* — Tuan C To
*Assistant Examiner* — Dominick Mulder
(74) *Attorney, Agent, or Firm* — Hodgson Russ LLP (57) ABSTRACT The disclosure provides an engine control method, system, and vehicle, and the vehicle comprises a battery and an engine, wherein the method includes: obtaining a current maximum discharge power value of the battery, and a current maximum external characteristic power value of the vehicle; obtaining a current opening value and a current opening change rate of an accelerator pedal of the vehicle; determining a driving intention based on the current opening value and the current opening change rate; and controlling start and stop of the engine according to the driving intention, the current maximum discharge power value, and the current maximum external characteristic power value of the vehicle. Since the driving intention is determined by the (Continued)

current opening value and the current opening change rate in advance, and based on the determined driving intention, in combination with the current maximum discharge power value of the battery and the current maximum external characteristic power value of the vehicle, the power response is carried out in advance so as to ensure that a larger power request can be satisfied at the next moment, thus avoiding the case where the engine is unnecessarily started or is not started in time.

11 Claims, 4 Drawing Sheets

(51) Int. Cl.
  *B60W 10/26* (2006.01)
  *B60W 20/13* (2016.01)
(52) U.S. Cl.
  CPC . *B60W 2510/086* (2013.01); *B60W 2510/244* (2013.01); *B60W 2540/10* (2013.01); *B60W 2710/0677* (2013.01)
(58) Field of Classification Search
  CPC ....... B60W 2510/244; B60W 2540/10; B60W 2710/0677; B60W 2540/103; B60W 20/19; B60W 20/40; B60W 2540/106; B60W 20/20; B60W 20/00; B60W 40/00; B60K 6/20
  USPC .......................................................... 701/22
  See application file for complete search history.

(56) References Cited

U.S. PATENT DOCUMENTS

| | | | | |
|---|---|---|---|---|
| 2003/0221883 | A1* | 12/2003 | Kubodera | B60K 6/52 903/917 |
| 2006/0106505 | A1* | 5/2006 | Kuge | B60W 40/09 701/1 |
| 2007/0287595 | A1* | 12/2007 | Kobiki | B60W 10/184 477/182 |
| 2008/0319601 | A1* | 12/2008 | Komeda | B60W 40/10 701/99 |
| 2012/0116650 | A1* | 5/2012 | Miyazaki | F02D 28/00 701/102 |
| 2012/0253576 | A1* | 10/2012 | Tamagawa | B60W 10/08 180/65.265 |
| 2013/0013161 | A1* | 1/2013 | Otsubo | B60W 50/06 701/52 |
| 2013/0139775 | A1* | 6/2013 | Moriya | F02N 11/0844 701/113 |
| 2013/0297193 | A1* | 11/2013 | Morisaki | F02N 11/084 903/903 |
| 2013/0332017 | A1* | 12/2013 | Hisano | B60W 10/06 180/65.265 |
| 2014/0257608 | A1* | 9/2014 | Dufford | B60W 20/12 903/930 |
| 2015/0019061 | A1* | 1/2015 | Ueno | B60W 20/10 903/903 |
| 2015/0239469 | A1* | 8/2015 | Yoshikawa | F16H 61/0213 701/51 |
| 2017/0197506 | A1* | 7/2017 | Inomata | B60W 30/09 |
| 2018/0056974 | A1* | 3/2018 | Meyer | B60K 6/48 |
| 2018/0208174 | A1 | 7/2018 | Kim | |
| 2019/0219163 | A1* | 7/2019 | Meyer | F16D 48/02 |

FOREIGN PATENT DOCUMENTS

| | | |
|---|---|---|
| CN | 107539308 | 1/2018 |
| CN | 108110282 | 6/2018 |
| CN | 109747625 | 5/2019 |
| CN | 109795476 | 5/2019 |
| CN | 109895758 | 6/2019 |
| CN | 110391482 | 10/2019 |
| EP | 1493608 | 10/2008 |
| WO | 2012152400 A1 | 11/2012 |
| WO | 2015060460 | 4/2015 |

OTHER PUBLICATIONS

CNIPA, First Office Action for CN Application No. 201911276800. 5, May 12, 2021.
EPO, Extended European Search Report issued for EP Application No. 20899859.1, Nov. 18, 2022.

* cited by examiner

ENGINE CONTROL METHOD, SYSTEM, AND VEHICLE

CROSS-REFERENCE TO RELATED APPLICATIONS

The present application is a U.S. national stage entry of International Application No. PCT/CN2020/130890, filed Nov. 23, 2020, which claims priority to Chinese Patent Application No. 201911276800.5, filed Dec. 12, 2019, the entire disclosures of which are incorporated herein by reference.

TECHNICAL FIELD

The disclosure relates to the technical field of automobiles, and more particularly, to an engine control method, system, and vehicle.

BACKGROUND

At present, for new energy vehicles of hybrid architecture, a vehicle is driven by an engine and/or a drive motor. When the power demand is relatively small, the drive motor can independently meet the driving requirements, and the vehicle will work in a series operation mode or a battery electric operation mode; when the power demand is great, the engine and the drive motor are required to drive the vehicle together in a parallel operation mode.

For new energy vehicles of the hybrid architecture, a rapid engine start is required to assist a battery-driven vehicle when the vehicle has an urgent power demand. At present, in the prior art, the engine start is mainly controlled in two ways: 1. The difference between the battery electric driving capability of the drive motor and the power demand is monitored, and the engine is started when the difference indicates that the power demand gradually approaches the battery electric drive capability; 2. The pedal opening value is monitored, and when the pedal opening value is greater than the calibrated value, the engine is started.

Both of the above-mentioned methods for controlling the engine start are easy to cause unnecessary start or start delay of the engine due to the unreasonable setting of the difference value and the calibrated value, resulting in a poor driving experience of the engine power response for the user and even a driving danger.

SUMMARY

In view of the foregoing, the disclosure is directed to an engine control method, system, and vehicle that solve the problem of poor engine power response of existing vehicle of hybrid architectures.

In order to achieve the above object, the technical solution of the disclosure is achieved as follows:
an engine control method applied to a vehicle including a battery and an engine, wherein the method comprises:
obtaining a current maximum discharge power value of the battery, and a current maximum external characteristic power value of the vehicle;
obtaining a current opening value and a current opening change rate of an accelerator pedal of the vehicle;
determining a driving intention based on the current opening value and the current opening change rate; and
controlling start and stop of the engine according to the driving intention, the current maximum discharge power value, and the current maximum external characteristic power value of the vehicle.

Furthermore, according to the engine control method, the vehicle is preset with an opening change rate condition;
the determining the driving intention according to the current opening value and the current opening change rate comprises:
controlling the opening change rate condition to be in an active state when the current opening change rate is greater than a first preset change rate;
controlling the opening change rate condition to be in a deactivated state when the opening change rate of the accelerator pedal is less than a second preset change rate; wherein the first preset change rate is greater than the second preset change rate;
controlling the opening change rate condition to remain to be in the current state when the current opening change rate is less than or equal to the first preset change rate and the opening change rate of the accelerator pedal is greater than or equal to the second preset change rate;
determining that the driving intention is urgent if the current opening value is greater than or equal to a preset opening value and the opening change rate condition is in the active state; and
determining that the driving intention is non-urgent if the current opening value is less than the preset opening value and/or the opening change rate condition is in the deactivated state.

Furthermore, according to the engine control method, the vehicle further includes a motor connected to the battery and the engine, and the controlling start and stop of the engine according to the driving intention, the current maximum discharge power value, and the current maximum external characteristic power value of the vehicle comprises:
controlling the engine to start, and controlling the engine to drive the vehicle if it is determined that the driving intention is urgent and the current maximum discharge power value is less than the current maximum external characteristic power value of the vehicle.

Furthermore, according to the engine control method, the vehicle further includes a motor electrically connected to the battery, and the controlling start and stop of the engine according to the driving intention, the current maximum discharge power value, and the current maximum external characteristic power value of the vehicle further comprises:
controlling the engine not to start, and controlling the battery to power the motor according to the required power of the vehicle if it is determined that the driving intention is non-urgent, and/or the current maximum discharge power value is greater than or equal to a current maximum external characteristic power value of the vehicle.

Furthermore, according to the engine control method, the controlling the engine to start and controlling the engine to drive the vehicle if it is determined that the driving intention is urgent and the current maximum discharge power value is less than a current maximum external characteristic power value of the vehicle further comprises:
controlling the engine to power the motor according to the required power of the motor and controlling the engine to charge the battery when the output power of the engine is greater than the required power of the motor.

Furthermore, according to the engine control method, after the engine required power is controlled to drive the vehicle and the engine is controlled to charge the battery when the output power of the engine is greater than the required power of the motor, it further comprises:

controlling the engine to enter into a stopped state if the current charge state value of the battery is greater than or equal to a first preset charge threshold.

Furthermore, according to the engine control method, the determining the current maximum discharge power value of the battery and the total current maximum external characteristic power value of the vehicle comprises:

obtaining a current charge state value of the battery, and determining the current maximum discharge power value corresponding to the current charge state value according to a first corresponding relationship between a preset charge state value and a maximum discharge power value; and obtaining a current driving mode of the vehicle, and determining the current maximum external characteristic power value of the vehicle corresponding to the current driving mode according to a second corresponding relationship between a preset driving mode and the current maximum external characteristic power value of the vehicle.

Furthermore, according to the engine control method, after the current charge state value of the battery is obtained and the current maximum discharge power value corresponding to the current charge state value is determined according to a first corresponding relationship between a preset charge state value and a maximum discharge power value, further comprising:

controlling the engine to start and controlling the engine to charge the battery if the current charge state value is less than a second preset charge threshold.

Another object of the disclosure is to provide an engine control system applied to a vehicle including a battery and an engine, wherein the system includes:

a first acquisition processor for obtaining a current maximum discharge power value of the battery, and a current maximum external characteristic power value of the vehicle;

a second acquisition processor for obtaining a current opening value and a current opening change rate of an accelerator pedal of the vehicle;

a determination processor for determining a driving intention based on the current opening value and the current opening change rate; and a control processor for controlling start and stop of the engine according to the driving intention, the current maximum discharge power value, and the current maximum external characteristic power value of the vehicle.

Furthermore, in the engine control system, the vehicle is preset with an opening change rate condition;

the determination processor comprises:

a first control processor for controlling the opening change rate condition to be in an active state when the current opening change rate is greater than a first preset change rate;

a second control processor for controlling the opening change rate condition to be in a deactivated state when the opening change rate of the accelerator pedal is less than a second preset change rate; wherein the first preset change rate is greater than the second preset change rate;

a third control processor for controlling the opening change rate condition to remain to be in the current state when the current opening change rate is less than or equal to a first preset change rate and the opening change rate of the accelerator pedal is greater than or equal to a second preset change rate;

a first determination unit for determining that the driving intention is urgent if the current opening value is greater than or equal to a preset opening value and the opening change rate condition is in the active state; and a first determination unit for determining that the driving intention is non-urgent if the current opening value is less than the preset opening value and/or the opening change rate condition is in the deactivated state.

Furthermore, in the engine control system, the vehicle further includes a motor connected to the battery;

the control processor comprises:

a fourth control processor for controlling the engine to start, and controlling the engine to drive the vehicle if it is determined that the driving intention is urgent and the current maximum discharge power value is less than the current maximum external characteristic power value of the vehicle.

Furthermore, in the engine control system, the control processor further includes:

a fifth control processor for controlling the engine not to start, and controlling the battery to power the motor according to the required power of the vehicle if it is determined that the driving intention is non-urgent, and/or the current maximum discharge power value is greater than or equal to a current maximum external characteristic power value of the vehicle.

Furthermore, in the engine control system, the control processor further includes:

a sixth control processor for controlling the engine to drive the vehicle according to the required power and controlling the engine to charge the battery when the output power of the engine is greater than the required power of the motor.

Furthermore, in the engine control system, the control processor further includes:

a seventh control processor for controlling the engine to enter into a stopped state if the current charge state value of the battery is greater than or equal to a first preset charge threshold.

Furthermore, in the engine control system, the first acquisition processor includes:

a first acquisition unit for obtaining a current charge state value of the battery, and determining the current maximum discharge power value corresponding to the current charge state value according to a first corresponding relationship between a preset charge state value and a maximum discharge power value; and a second acquisition unit for obtaining a current driving mode of the vehicle, and determining the current maximum external characteristic power value of the vehicle corresponding to the current driving mode according to a second corresponding relationship between a preset driving mode and the current maximum external characteristic power value of the vehicle.

Furthermore, in the engine control system, the control processor further includes:

an eighth control processor for controlling the engine to start and controlling the engine to charge the battery if the current charge state value is less than a second preset charge threshold.

The engine control method and system of the disclosure have the following advantages over the prior art:

a current opening value and a current opening change rate of an accelerator pedal of a vehicle are obtained first, a driving intention is determined according to the current opening value and the current opening change rate, a current maximum discharge power value of a battery and a current maximum external characteristic power value of the vehicle are obtained at the same time, and then the start and stop of the engine are controlled according to the driving intention, the current maximum discharge power value and the current maximum external characteristic power value of the vehicle. Since the driving intention is determined by the current opening value and the current opening change rate in advance, and based on the determined driving intention, in combination with the current maximum discharge power value of the battery and the current maximum external characteristic power value of the vehicle, the power response is carried out in advance so as to ensure that a larger power request can be satisfied at the next moment, thus avoiding the case where the engine is unnecessarily started or is not started in time, thereby solving the problem of poor power response of the engine of the existing vehicle of hybrid architecture.

It is still another object of the disclosure to provide a vehicle, wherein the vehicle comprises the engine control system.

The advantages of the vehicle and the above engine control method and system are the same as those of the prior art, and are not described herein again.

The foregoing description is only an overview of the technical solutions of the disclosure, and the embodiments of the disclosure are described below in order that the technical means of the disclosure may be clearly understood, and the foregoing and other objects, features, and advantages of the disclosure may be more clearly understood.

BRIEF DESCRIPTION OF THE DRAWINGS

In order to clearly illustrate the embodiments or technical solutions of the disclosure, the drawings used in the embodiments or technical solutions of the disclosure will be briefly described below, and it is obvious that the drawings in the following description are some embodiments of the disclosure, and other drawings can be obtained by those skilled in the art without creative efforts.

The accompanying drawings, which are included to provide a further understanding of the disclosure, illustrate embodiments of the disclosure and together with the description serve to explain the disclosure and are not to be construed as limiting the disclosure. In the drawings.

DETAILED DESCRIPTION OF THE EMBODIMENTS

To make the objects, technical solutions and advantages of the embodiments of the disclosure more apparent, the technical solutions in the embodiments of the disclosure will be described clearly and completely with reference to the drawings in the embodiments of the disclosure, and it is obvious that the described embodiments are some, but not all embodiments of the disclosure. All other embodiments, which can be derived by a person skilled in the art from the embodiments disclosed herein without inventive step, are intended to be within the scope of the disclosure.

Embodiments of the present application will be described in more detail below with reference to the accompanying drawings. While embodiments of the present application are illustrated in the drawings, it should be understood that the present application may be embodied in various forms and should not be limited to the embodiments set forth herein. Rather, these embodiments are provided so that this disclosure will be thorough and complete, and will fully convey the scope of the disclosure to those skilled in the art.

It should be noted that, in the disclosure, the embodiments and the features of the embodiments may be combined with each other without conflict.

The disclosure will be described in detail below with reference to the accompanying drawings in conjunction with embodiments.

Figure 1:
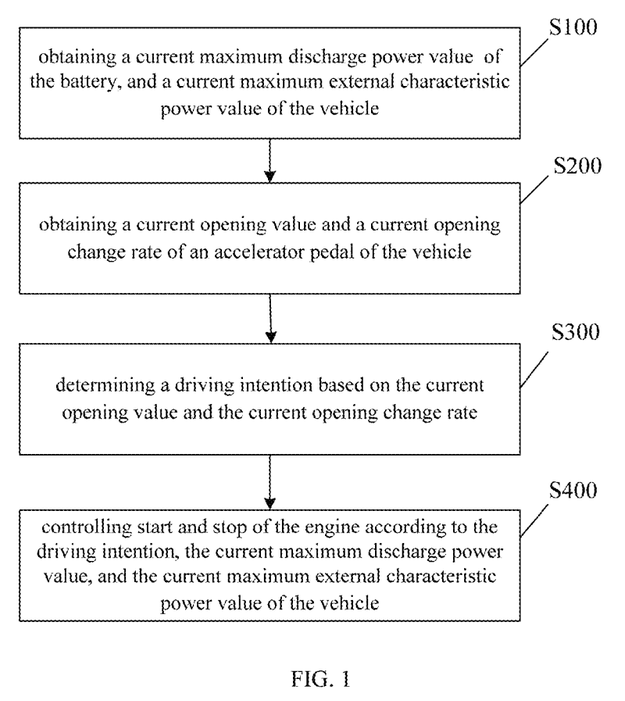
FIG. 1 is a schematic flow diagram of an engine control method according to an embodiment of the disclosure.

Referring to FIG. 1, there is shown an engine control method according to an embodiment of the disclosure, applied to a vehicle including a battery and an engine, the method including steps S100 to S400:

Step S100, obtaining a current maximum discharge power value of the battery, and a current maximum external characteristic power value of the vehicle;

In the above-mentioned step S100, the current maximum discharge power value refers to the maximum output power value that can be currently provided by the battery. The current maximum discharge power value of the battery needs to be obtained because it is only when the battery is unable to provide sufficient electrical power to the vehicle that the engine needs to be started to power the vehicle.

In the above-mentioned step S100, the current maximum external characteristic power value of the vehicle refers to the maximum operating power value that the vehicle can reach, and the current maximum external characteristic power value of the vehicle refers to the vehicle maximum operating power value of the vehicle in the current driving mode.

In the above-mentioned step S100, since it is impossible to predict whether the vehicle needs to be operated at the maximum operating power value, it can be determined that if the current maximum discharge power value of the battery is greater than the current maximum external characteristic power value of the vehicle, the vehicle can be operated at the maximum power by supplying electric energy independently from the battery, that is, all the driving intentions within the allowable range of the vehicle can be satisfied independently by the battery, that is, there is no need to start the engine to supply power to the motor in an urgent driving intention. Thus, the embodiment of the disclosure the current maximum discharge power value of the battery and the current maximum external characteristic power value of the vehicle in advance are obtained, thereby it is possible to avoid the problem of starting the engine in the case where the current maximum operating power of the vehicle can be satisfied independently by using the battery when the driver has a quick power request.

Optionally, the above-mentioned step S100 comprises steps S1001 to S1002:

Step S1001, obtaining a current charge state value of the battery, and determining the current maximum discharge power value corresponding to the current charge state value according to a first corresponding relationship between a preset charge state value and a maximum discharge power value.

In practice, since the maximum discharge power of a battery corresponds to the charge state values of the battery one by one, and the corresponding relationships between the maximum discharge power of different batteries and the charge state values thereof are different, a first corresponding relationship between the maximum discharge power of the battery and the charge state values needs to be pre-established, and in this step S100, the current charge state value of the battery is first obtained, and then the current maximum discharge power value of the battery is determined according to the first corresponding relationship between the pre-set charge state value and the current maximum discharge power value.

Step S1002, obtaining a current driving mode of the vehicle, and determining the current maximum external characteristic power value of the vehicle corresponding to the current driving mode according to a second corresponding relationship between a preset driving mode and the current maximum external characteristic power value of the vehicle.

In practice, since a vehicle often has multiple driving modes, and the maximum required power value of the vehicle is different under different driving modes, a second corresponding relationship between the current maximum external characteristic power value of the vehicle and the driving mode needs to be pre-established, and in this step, a current driving mode of the vehicle flow is obtained, and the current maximum external characteristic power value of the vehicle is determined according to the corresponding relationship between the current maximum external characteristic power value of the vehicle and the driving mode.

Step S200, obtaining a current opening value and a current opening change rate of an accelerator pedal of the vehicle.

In the above-mentioned step S200, the current opening value of the accelerator pedal refers to the ratio between the current depression angle of the accelerator pedal and the upper limit value of the range of the depression angle of the accelerator pedal, wherein, the current depression angle refers to the included angle value between the current position of the accelerator pedal and the initial position of the accelerator pedal, and the current opening value directly corresponds to the target power value of the vehicle, i.e., to the target torque of the vehicle. However, the current opening change rate refers to the current opening degree rate of change value of the accelerator pedal in a unit time, and reflects the current opening change rate of the current accelerator pedal, and the current opening change rate can be obtained by differentiating the time through the relationship function between the opening rate of the accelerator pedal and the time.

Wherein, the current opening value of the accelerator pedal can be directly obtained by detecting the included angle value between the current position of the accelerator pedal and the position of the accelerator pedal when the accelerator pedal is not treaded. In addition, the current opening change rate can be obtained by detecting the change value $\Delta y$ of the accelerator pedal opening within a period $\Delta t$, and then calculating the opening change rate Ratio=$\Delta y/\Delta t$.

Figure 2:
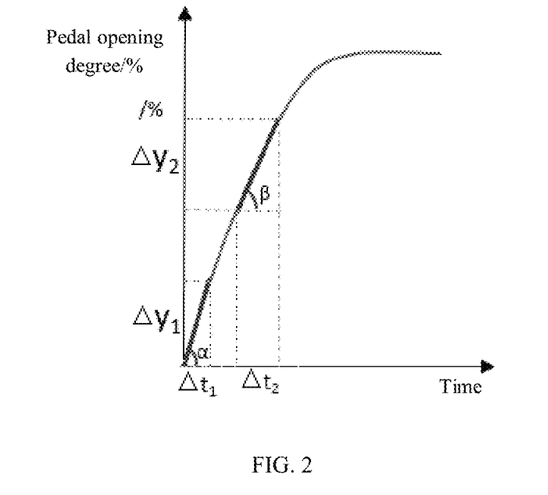
FIG. 2 is a schematic diagram of an opening change rate acquisition process of an accelerator pedal according to an embodiment of the disclosure.

Specifically, referring to FIG. 2, which shows a schematic diagram of an opening change rate acquisition process of an accelerator pedal in an embodiment of the disclosure in practice. As shown in FIG. 2, the corresponding change rate of the opening degree at $\alpha$ is $\Delta y1/\Delta t1$, where $\Delta y1$ is the opening degree change quantity in the period of $\Delta t1$; the corresponding change rate of the opening degree at $\beta$ is $\Delta y2/\Delta t2$, where $\Delta y2$ is an opening degree change quantity in the period of $\Delta t2$.

Step S300, determining a driving intention based on the current opening value and the current opening change rate.

In step S300, by combining the current opening value of the accelerator pedal with the current opening change rate, a current driving intention of the driver is determined, and the driving intention may include an urgent driving intention, a non-urgent driving intention, and so on. The change rate of the opening degree of the accelerator pedal is mainly considered to monitor the driving intention of the driver, because the change rate of the opening degree of the accelerator pedal can clearly reflect the degree of the driver's demand for the power of the vehicle, when the change rate of the opening degree is small, it means that the driver does not need the vehicle to respond quickly to a large torque, and when the change rate is large, it means that the driver has a relatively urgent demand for the power of the vehicle. Although the available torque of the vehicle can still meet the current demand, the vehicle must be prepared to output the maximum power in advance to ensure that the larger torque request can be met at the next moment.

In the above-mentioned step S300, since the change rate of the opening degree is large in a short period of time from the accelerator pedal in a non-treaded state to a treaded state, but the corresponding target torque demand is not large, it is likely that the driving demand can be satisfied by supplying power to the motor of the vehicle through the battery, and there is no need to start the engine to drive the vehicle at all. It can be seen that if the driving intention of the driver is determined by the opening change rate of the accelerator pedal alone, it is easy to misjudge a non-urgent power request into an urgent power request. Therefore, it is necessary to preset an opening value indicating a minimum open lower limit value of the accelerator pedal with a request willingness, and when the current opening value of the accelerator pedal is greater than the preset opening value, the driving intention is need to further determined in combination with the opening change rate of the accelerator pedal.

By setting a preset opening value, it is possible to prevent the accelerator pedal from being erroneously treaded to produce a large change rate, but without a large opening degree of the pedal, it is erroneously determined that the driver has an urgent power request, that is, it is erroneously determined that the driver has an urgent driving intention.

Step S400, controlling start and stop of the engine according to the driving intention, the current maximum discharge power value, and the current maximum external characteristic power value of the vehicle.

Since it is impossible to predict whether the vehicle needs to be operated with the maximum operating power value, it can be determined that if the current maximum discharge power value of the battery is greater than or equal to the current maximum external characteristic power value of the vehicle, the vehicle can be operated at the maximum operating power by supplying electric energy independently from the battery, that is, all driving intentions within the allowable range of the vehicle can be satisfied independently by the battery, without starting the engine to power the motor, or even without starting the engine and directly driving the vehicle with the engine.

However, when the current maximum discharge power value of the battery is less than the current maximum external characteristic power value of the vehicle, it is indicated that the maximum operating power value demand of the vehicle cannot be satisfied independently by the battery. Although it cannot be determined whether the vehicle needs to operate with the maximum operating power value, in order to ensure that the subsequent power demand of the vehicle can be met, it is necessary to control the engine to carry out a corresponding start-up action in accordance with the driving intention determined in step S300.

Therefore, in step S400, after the driver's driving intention is determined in step S300, it is necessary to determine whether the engine needs to be started and to control the engine to carry out the corresponding start and stop operation by combination of the current maximum discharge power value of the battery and the current maximum external characteristic power value of the vehicle. Thus, it is possible not only to control the engine start in advance when the driving intention is to start the engine, but also to avoid starting the engine when the battery power is sufficient and the maximum operating power of the vehicle in the current state can be satisfied independently by using the battery.

The engine control method of the disclosure has the following advantages over the prior art:

a current opening value and a current opening change rate of an accelerator pedal of a vehicle are obtained first, a driving intention is determined according to the current opening value and the current opening change rate, a current maximum discharge power value of a battery and a current maximum external characteristic power value of the vehicle are obtained at the same time, and then the start and stop of the engine are controlled according to the driving intention, the current maximum discharge power value and the current maximum external characteristic power value of the vehicle. Since the driving intention is determined by the current opening value and the current opening change rate in advance, and based on the determined driving intention, in combination with the current maximum discharge power value of the battery and the current maximum external characteristic power value of the vehicle, the power response is carried out in advance so as to ensure that a larger power request can be satisfied at the next moment, thus avoiding the case where the engine is unnecessarily started or is not started in time, thereby solving the problem of poor power response of the engine of the existing vehicle of hybrid architecture.

Since, in practical applications, when the accelerator pedal is quickly treaded, the opening degree change of the pedal is more and more slow, and in the process of treading, the change rate of the opening degree will slightly decrease, which is normal, but the driver's power demand for the vehicle does not actually decrease, thus it is obviously unreasonable to determine that the driver has no urgent driving intention at this time.

Thus, optionally, according to the engine control method provided by the embodiment of the disclosure in which the vehicle is preset with the opening change rate condition, the above-described step S300 may include steps S3001 to S3005:

Step S3001, controlling the opening change rate condition to be in an active state when the current opening change rate is greater than a first preset change rate.

In the above-mentioned step S3001, the first preset change rate is an opening change rate limit value for determining whether the driver has an intention to accelerate urgently. When the current opening change rate of the accelerator pedal is greater than the first preset change rate, it is indicated that the driver is likely to have an urgent driving intention, and thus the opening change rate condition is activated so that the opening change rate condition is in an active state.

Step S3002, controlling the opening change rate condition to be in a deactivated state when the opening change rate of the accelerator pedal is less than a second preset change rate; wherein the first preset change rate is greater than the second preset change rate;

In the above-mentioned step S3002, the second preset change rate is an opening change rate limit value for determining whether the driver has an intention to accelerate urgently. When the current opening change rate of the accelerator pedal is less than the second preset change rate, it is indicated that the driver has no urgent driving intention, and the opening change rate condition is deactivated so that the opening change rate condition is in the deactivated state.

Step S3003, controlling the opening change rate condition to remain to be in the current state when the current opening change rate is less than or equal to a first preset change rate and the opening change rate of the accelerator pedal is greater than or equal to a second preset change rate.

In the above-mentioned step S3003, when the opening change rate of the accelerator pedal is between the first preset change rate and the second preset change rate, it is indicated that the opening change rate state in which the opening change rate condition in the deactivated state is activated is not reached, and the opening change rate state in which the opening change rate condition in the activated state is not reached, and therefore the original state of the opening change rate condition is not changed, namely, the control degree change rate condition maintains the current state thereof.

It can be seen from steps S3001-S3003 that the embodiment of the disclosure reserves a certain amount of receipt for the activation of the opening change rate condition, wherein the amount of receipt is the difference between the first preset change rate and the second preset change rate. If the current opening rate of the accelerator pedal satisfies a higher entry condition than the first preset change rate, the opening change rate condition is in an active state, and in the active state, the entry condition that the current opening change rate is lower than the first preset change rate is allowed, and the opening change rate condition remains in the active state as long as the exit condition that the current opening change rate is not lower than the second preset change rate is not satisfied.

Similarly, if the current opening rate of the accelerator pedal satisfies a lower exit condition less than the second preset change rate, the opening change rate condition is in a deactivated state, in which the exit condition that the current opening change rate is higher than the second preset change rate is allowed, and the opening change rate condition remains in the deactivated state as long as the exit condition is higher than the first preset change rate.

Step S3004, determining that the driving intention is urgent if the current opening value is greater than or equal to a preset opening value and the opening change rate condition is in the active state.

In the above-mentioned step S3004, a preset opening value is set in advance, and it is determined that the driver currently has the urgent driving intention only if the current opening value of the accelerator pedal is greater than or equal to the preset opening value and the opening change rate condition is active. Here, by setting a preset opening value, it is possible to prevent the accelerator pedal from being erroneously treaded to cause a large opening change rate and activate the opening change rate, but without a large opening degree of the pedal, it is erroneously determined that the driver has an urgent power request, that is, it is erroneously determined that the driver has an urgent driving intention.

In addition, combining with steps 3001-S3004, it can be seen that reserving a certain amount of receipt for the activation of the opening change rate condition can avoid the case where the driver does have an urgent driving intention, which however is erroneously determined as a non-urgent driving intention because the current opening change rate is greater than the first preset change rate when the accelerator pedal is initially treaded, the current opening degree of the accelerator pedal has not yet reached the preset opening value; and avoiding a case where the driver does have an urgent driving intention, which however is erroneously determined as a non-urgent driving intention because the opening change rate decreases to less than or equal to the first preset degree of change when the current degree of change in which the accelerator pedal is treaded reaches the preset opening value.

Step S3005, determining that the driving intention is non-urgent if the current opening value is less than the preset opening value and/or the opening change rate condition is in the deactivated state.

In the above-mentioned step S3005, when any one or more case, that the current opening value of the accelerator pedal is less than the preset opening value and the opening change rate condition is in a deactivated state, is satisfied, it can be determined that the driver's current driving intention is non-urgent.

Figure 3:
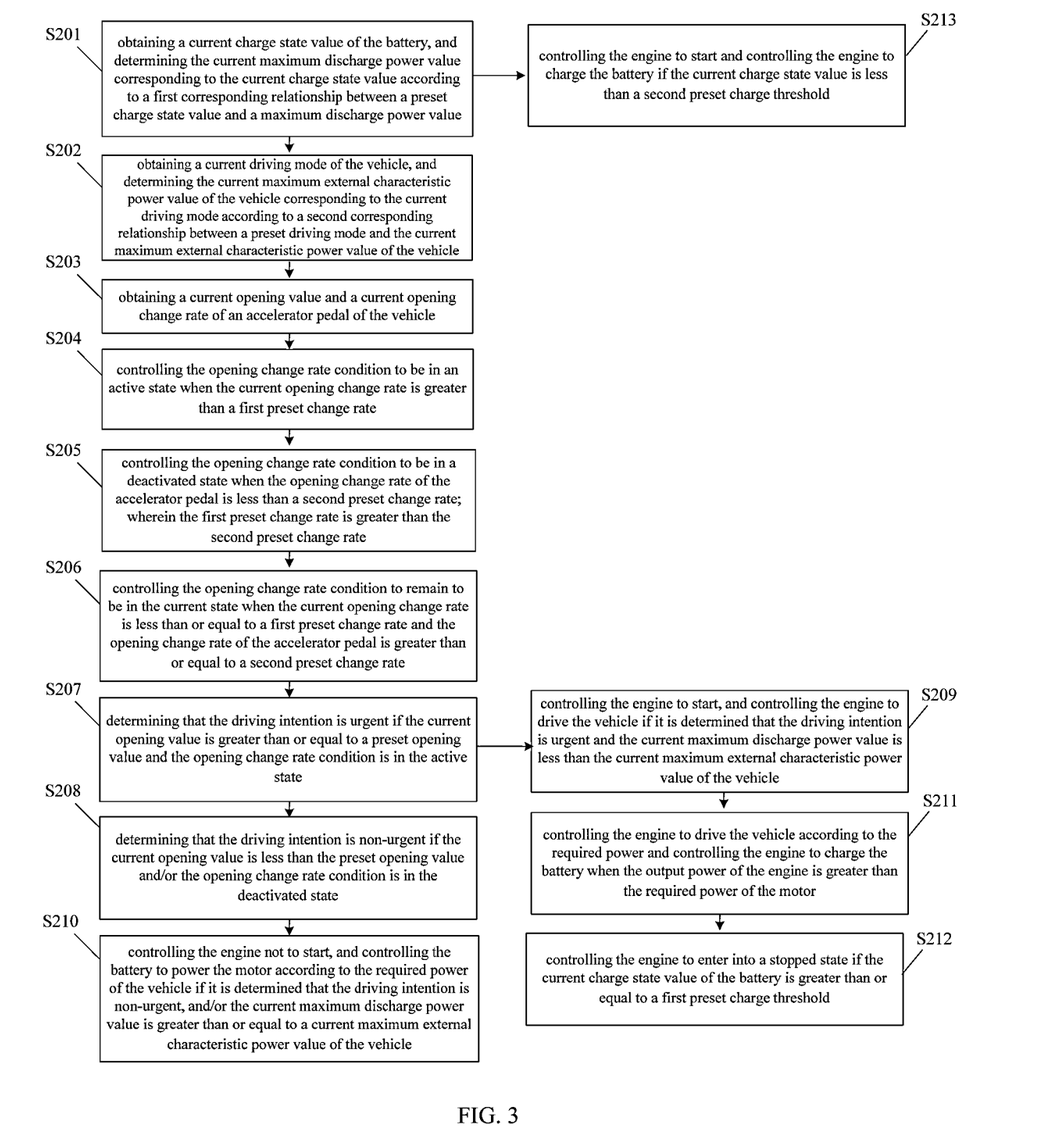
FIG. 3 is a schematic flow diagram of an engine control method according to another embodiment of the disclosure.

Referring to FIG. 3, a flowchart of a preferred embodiment of the disclosure is shown. In the preferred embodiment provided by the disclosure, the engine control method described above is applied to a vehicle including a battery and an engine, the vehicle further including a motor electrically connected to the battery, the vehicle being preset with an opening change rate condition, and the engine control method comprises steps S201 to S210.

It should be noted that the vehicle in the embodiment of the disclosure further includes a generator matched with the engine, the generator being driven by the engine to generate electricity, and the generator being electrically connected to both the battery and the motor, so that the engine can drive the generator to generate electricity, and thus the engine can supply electricity to the battery and/or the motor through the generator.

Step S201, obtaining a current charge state value of the battery, and determining the current maximum discharge power value corresponding to the current charge state value according to a first corresponding relationship between a preset charge state value and a maximum discharge power value.

The above-mentioned step S201 can be described in detail with reference to step S100, and will not be described again here.

Step S202, obtaining a current driving mode of the vehicle, and determining the current maximum external characteristic power value of the vehicle corresponding to the current driving mode according to a second corresponding relationship between a preset driving mode and the current maximum external characteristic power value of the vehicle.

The above-mentioned step S201 can be described in detail with reference to step S100, and will not be described again here.

Step S203, obtaining a current opening value and a current opening change rate of an accelerator pedal of the vehicle.

The above-mentioned step S201 can be described in detail with reference to step S100, and will not be described again here.

Step S204, controlling the opening change rate condition to be in an active state when the current opening change rate is greater than a first preset change rate.

The above-mentioned step S201 can be described in detail with reference to step S100, and will not be described again here.

Step S205, controlling the opening change rate condition to be in a deactivated state when the opening change rate of the accelerator pedal is less than a second preset change rate; wherein the first preset change rate is greater than the second preset change rate.

The above-mentioned step S201 can be described in detail with reference to step S100, and will not be described again here.

Step S206, controlling the opening change rate condition to remain to be in the current state when the current opening change rate is less than or equal to a first preset change rate and the opening change rate of the accelerator pedal is greater than or equal to a second preset change rate.

The above-mentioned step S201 can be described in detail with reference to step S100, and will not be described again here.

Step S207, determining that the driving intention is urgent if the current opening value is greater than or equal to a preset opening value and the opening change rate condition is in the active state.

The above-mentioned step S201 can be described in detail with reference to step S100, and will not be described again here.

Step S208, determining that the driving intention is non-urgent if the current opening value is less than the preset opening value and/or the opening change rate condition is in the deactivated state.

The above-mentioned step S201 can be described in detail with reference to step S100, and will not be described again here.

Step S209, controlling the engine to start, and controlling the engine to drive the vehicle if it is determined that the driving intention is urgent and the current maximum discharge power value is less than the current maximum external characteristic power value of the vehicle.

In the above-mentioned step S209, if it is determined that the driving intention of the driver is an urgent driving intention, and the current maximum discharge power value of the battery is less than the current maximum external characteristic power value of the vehicle, it is indicated that the battery is about to fail to meet the power demand of the vehicle, and therefore the engine start needs to be controlled to provide the driving force to the vehicle.

The step S209 is implemented differently for different vehicle architectures.

Wherein when the vehicle is a parallel architecture vehicle, the step S209 includes a step S901:

Step S901, if it is determined that the driving intention is urgent and the current maximum discharge power value is less than the current maximum external characteristic power value of the vehicle, controlling the engine to start and controlling the engine to drive wheels through a transmission mechanism, and driving the vehicle to travel according to the required power of the vehicle.

That is, when the vehicle is a parallel architecture vehicle, after the engine is started, the engine is controlled to drive the wheels according to the required power of the vehicle, thereby achieving the purpose of driving the vehicle. Obviously, in the process of starting the engine, the output power thereof changes from small to large, and the output power thereof cannot meet the demand of the vehicle instantaneously, and thus when the output power of the engine does not reach the required power of the vehicle, the battery supplies power to the motor, and the engine and the motor together provide the driving force for the vehicle.

Wherein, when the vehicle is a series architecture vehicle, the step S209 includes a step S902:

Step S902, if it is determined that the driving intention is urgent and the current maximum discharge power value is less than the current maximum external characteristic power value of the vehicle, controlling the engine to start and controlling the engine to supply power to the motor, and driving the vehicle to travel by the motor according to the required power of the vehicle.

That is, when the vehicle is a series architecture vehicle, after starting the engine, the engine is controlled to supply power to the motor according to the required power of the vehicle, and then the motor drives the vehicle to travel according to the required power of the vehicle. Obviously, in the process of starting the engine, the output power thereof changes from small to large, and the output power thereof cannot meet the demand of the vehicle instantaneously, and thus when the output power of the engine does not reach the required power of the vehicle, the engine is controlled to supply power to the motor together with the battery according to the required power of the vehicle, and the motor drives the vehicle to travel according to the required power of the vehicle.

Wherein, when the vehicle is a vehicle of hybrid architecture, the step S209 includes steps S903 to S905:

Step S903, controlling the engine to start if it is determined that the driving intention is urgent and the current maximum discharge power value is less than the current maximum external characteristic power value of the vehicle; if the required power of the vehicle is less than or equal to the upper limit value of the output power of the motor, controlling the engine to supply power to the motor, and driving the vehicle to travel by the motor according to the required power of the vehicle; if the required power of the vehicle is greater than the upper limit value of the output power of the motor, controlling the engine to drive the wheels through the transmission mechanism so as to drive the vehicle to travel according to the required power of the vehicle.

That is, when the vehicle is a vehicle of hybrid architecture, after starting the engine, it is necessary to further determine how the engine specifically drives the vehicle to travel according to the required power according to the upper limit value of the output power of the motor and the required power of the vehicle.

Specifically, when the required power of the vehicle is less than or equal to the upper limit value of the output power of the motor, it is indicated that sufficient driving power can be supplied to the vehicle by the motor alone as long as sufficient electric power is supplied to the motor, thereby controlling the engine to supply power to the motor, and driving the vehicle to travel by the motor according to the required power of the vehicle;

However, when the required power of the vehicle is greater than the upper limit value of the output power of the motor, it is indicated that the motor alone cannot provide sufficient driving force for the vehicle, so it is necessary to control the engine to directly drive the wheels through the transmission mechanism, thereby achieving the purpose of driving the vehicle to travel according to the required power of the vehicle. Obviously, in the process of starting the engine, the output power thereof changes from small to large, and the output power thereof cannot meet the demand of the vehicle instantaneously, and thus when the output power of the engine does not reach the required power of the vehicle, the battery supplies power to the motor, and the engine and the motor together provide the driving force for the vehicle.

Step S210, controlling the engine not to start, and controlling the battery to power the motor according to the required power of the vehicle if it is determined that the driving intention is non-urgent, and/or the current maximum discharge power value is greater than or equal to a current maximum external characteristic power value of the vehicle.

In the above-mentioned step S210, when any one or more conditions, that the driving intention is non-urgent and the current maximum discharge power value is greater than or equal to the current maximum external characteristic power value of the vehicle, are satisfied, the engine is not controlled to be started. Wherein, if the driving intention is non-urgent, it is also indicated that the driver does not have a large torque demand or a rapid acceleration demand for the time being, and therefore there is no need to start the engine in advance; when the current maximum discharge power value is greater than or equal to the current maximum external characteristic power value of the vehicle, the battery independently enables the motor to provide sufficient driving force for the vehicle, thereby eliminating the need to start the engine in advance.

Optionally, as shown in FIG. 3, the engine control method provided by the embodiment of the disclosure, after step S209, further includes step S211:

Step S211, controlling the engine to drive the vehicle according to the required power and controlling the engine to charge the battery when the output power of the engine is greater than the required power of the motor.

In the above-mentioned step S211, i.e., when the output power of the engine is greater than the required power of the vehicle, such as in the case of braking or stopping the vehicle, the engine is controlled to drive the vehicle at the actual required power of the vehicle, and the remaining portion of the output power of the engine is used to charge the battery, thereby achieving the effect of recovering energy.

Furthermore, as shown in FIG. 2, the engine control method provided by the embodiment of the disclosure, after step S211, further includes step S212:

Step S212, controlling the engine to enter into a stopped state if the current charge state value of the battery is greater than or equal to a first preset charge threshold.

In step S212, the first preset charge threshold value is an upper limit value of a charge state value of the battery corresponding to the maximum battery capacity of the battery. After the engine charges the battery, if the current charge state value of the battery is greater than or equal to the first preset charge threshold value, it is indicated that the battery has sufficient electric energy, so the engine is controlled to no longer charge the battery, the engine is controlled to enter into a stop state, and the battery is controlled to power the motor according to the required power of the vehicle, so as to save energy consumption.

Optionally, as shown in FIG. 3, the engine control method provided by the embodiment of the disclosure, after step S201, further includes step S213:

Step S213, controlling the engine to start and controlling the engine to charge the battery if the current charge state value is less than a second preset charge threshold.

In the above-mentioned step S213, the second pre-set charge threshold value is a lower limit value of a charge state value of the battery, corresponding to the minimum electric quantity of the battery. When the current charge state value of the battery is less than the second preset charge threshold value, it is indicated that the battery is undercharged, and therefore the engine needs to be started to charge the battery in order for the battery to have sufficient power to meet the usage requirements of the vehicle.

The engine control method of the disclosure has the following advantages over the prior art:

a current maximum discharge power value of the battery and a current maximum external characteristic power value of the vehicle are monitored, a current opening value of an accelerator pedal of the vehicle and a current opening change rate of the accelerator pedal are monitored, and an opening change rate is preset, wherein the opening change rate is in an active state when the current opening change rate is greater than a first preset change rate, is in a deactivated state when the current opening change rate is less than a second preset change rate, and remains to be in the original state unchanged when the current opening change rate is less than or equal to the first preset change rate and the current opening change rate is greater than or equal to the second preset change rate; then the engine is controlled to start and the vehicle is driven by the engine if the current opening value is greater than or equal to the preset opening value, the open change module is in an active state, and the current maximum discharge power value is less than the current maximum external characteristic power value of the vehicle. When the opening change rate is in an active state and the current opening value reaches the preset opening value, it is indicated that the driver currently has an urgent power demand, and if the current maximum discharge power value is less than the current maximum external characteristic power value of the vehicle, it is indicated that the current electric quantity of the battery is insufficient to achieve the vehicle maximum external characteristic power state, so it is necessary to control the engine start and drive the vehicle by the engine. The embodiment of the disclosure solves the problem of poor engine power response of existing vehicle of hybrid architectures by integrating the opening value and the opening change rate of the accelerator pedal when the current maximum discharge power value is less than the current maximum external characteristic power value of the vehicle, accurately predicting the driver's urgent power demand driving intention, and then controlling the engine start in advance so that the power output of the motor can timely match the driver's driving demand.

Figure 4:
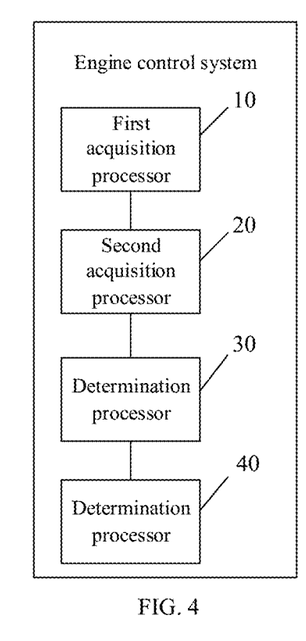
FIG. 4 is a schematic configuration diagram of an engine control system according to an embodiment of the disclosure.

Another object of the disclosure is to provide an engine control system applied to a vehicle including a battery and a motor, wherein reference is made to FIG. 4 showing a schematic structural diagram of an engine control system according to an embodiment of the disclosure, the system including:

a first acquisition processor 10 for obtaining a current maximum discharge power value of the battery, and a current maximum external characteristic power value of the vehicle;

a second acquisition processor 20 for obtaining a current opening value and a current opening change rate of an accelerator pedal of the vehicle;

a determination processor 30 for determining a driving intention based on the current opening value and the current opening change rate; and a control processor 40 for controlling start and stop of the engine according to the driving intention, the current maximum discharge power value, and the current maximum external characteristic power value of the vehicle.

In the system according to the embodiment of the disclosure, the current opening value and the current opening change rate of the accelerator pedal of the vehicle are obtained by a second acquisition processor 20, the driving intention is determined by a determination processor 30 according to the current opening value and the current opening change rate, the current maximum discharge power value of the battery and the current maximum external characteristic power value of the vehicle are obtained by a first acquisition processor 10, and then the start and stop of the engine are controlled by a control processor 40 according to the driving intention, the current maximum discharge power value and the current maximum external characteristic power value of the vehicle. Since the driving intention is determined by the current opening value and the current opening change rate in advance, and based on the determined driving intention, in combination with the current maximum discharge power value of the battery and the current maximum external characteristic power value of the vehicle, the power response is carried out in advance so as to ensure that a larger power request can be satisfied at the next moment, thus avoiding the case where the engine is unnecessarily started or is not started in time, thereby solving the problem of poor power response of the engine of the existing vehicle of hybrid architecture.

Optionally, in the engine control system, the vehicle is preset with an opening change rate condition;

the determination processor 30 comprises:

a first control processor for controlling the opening change rate condition to be in an active state when the current opening change rate is greater than a first preset change rate;

a second control processor for controlling the opening change rate condition to be in a deactivated state when the opening change rate of the accelerator pedal is less than a second preset change rate; wherein the first preset change rate is greater than the second preset change rate;

a third control processor for controlling the opening change rate condition to remain to be in the current state when the current opening change rate is less than or equal to a first preset change rate and the opening change rate of the accelerator pedal is greater than or equal to a second preset change rate;

a first determination unit for determining that the driving intention is urgent if the current opening value is greater than or equal to a preset opening value and the opening change rate condition is in the active state; and a first determination unit for determining that the driving intention is non-urgent if the current opening value is less than the preset opening value and/or the opening change rate condition is in the deactivated state.

Optionally, in the engine control system, the vehicle further includes a motor connected to the battery;

The control processor 40 comprises:
a fourth control processor for controlling the engine to start, and controlling the engine to drive the vehicle if it is determined that the driving intention is urgent and the current maximum discharge power value is less than the current maximum external characteristic power value of the vehicle.

Optionally, in the engine control system, the control processor 40 further comprises:
a fifth control processor for controlling the engine not to start, and controlling the battery to power the motor according to the required power of the vehicle if it is determined that the driving intention is non-urgent, and/or the current maximum discharge power value is greater than or equal to a current maximum external characteristic power value of the vehicle.

Furthermore, in the engine control system, the control processor 40 further comprises:
a sixth control processor for controlling the engine to drive the vehicle according to the required power and controlling the engine to charge the battery when the output power of the engine is greater than the required power of the motor.

Optionally, in the engine control system, the control processor 40 further comprises:
a seventh control processor for controlling the engine to enter into a stopped state if the current charge state value of the battery is greater than or equal to a first preset charge threshold.

Optionally, in the engine control system, the first acquisition processor 10 comprises:
a first acquisition unit for obtaining a current charge state value of the battery, and determining the current maximum discharge power value corresponding to the current charge state value according to a first corresponding relationship between a preset charge state value and a maximum discharge power value; and
a second acquisition unit for obtaining a current driving mode of the vehicle, and determining the current maximum external characteristic power value of the vehicle corresponding to the current driving mode according to a second corresponding relationship between a preset driving mode and the current maximum external characteristic power value of the vehicle.

Optionally, in the engine control system, the control processor 40 further comprises:
an eighth control processor for controlling the engine to start and controlling the engine to charge the battery if the current charge state value is less than a second preset charge threshold.

It is still another object of the disclosure to provide a vehicle, wherein the vehicle comprises the engine control system.

The advantages of the vehicle and the above engine control method and system are the same as those of the prior art, and are not described herein again.

The technical details and advantages of the above-described system and vehicle have been described in detail in the above-described method, and will not be described in detail here.

In summary, the present application provides an engine control method, system and vehicle, wherein a current opening value and a current opening change rate of an accelerator pedal of a vehicle are obtained first, a driving intention is determined according to the current opening value and the current opening change rate, a current maximum discharge power value of a battery and a current maximum external characteristic power value of the vehicle are obtained at the same time, and then the start and stop of the engine are controlled according to the driving intention, the current maximum discharge power value and the current maximum external characteristic power value of the vehicle. Since the driving intention is determined by the current opening value and the current opening change rate in advance, and based on the determined driving intention, in combination with the current maximum discharge power value of the battery and the current maximum external characteristic power value of the vehicle, the power response is carried out in advance so as to ensure that a larger power request can be satisfied at the next moment, thus avoiding the case where the engine is unnecessarily started or is not started in time, thereby solving the problem of poor power response of the engine of the existing vehicle of hybrid architecture.

It will be clear to a person skilled in the art that, for the convenience and brevity of the description, specific operating procedures of the above described systems, devices and units may be referred to corresponding procedures in the preceding method embodiments and will not be described in detail here.

The above description is meant to be illustrative of the preferred embodiments of the disclosure and not to be construed as limiting the disclosure, and any modifications, equivalents, improvements, etc. that fall within the spirit and scope of the disclosure are intended to be included therein.

The above description is only for the specific embodiments of the disclosure, but the scope of the disclosure is not limited thereto, and any person skilled in the art can easily think of the changes or substitutions within the technical scope of the disclosure, and shall cover the scope of the disclosure. Therefore, the protection scope of the disclosure shall be subject to the protection scope of the claims.

The above-described embodiments of the apparatus are merely illustrative, and the units described as separate parts may or may not be physically separate, and parts displayed as units may or may not be physical units, may be located in one position, or may be distributed on multiple netoperate units. Some or all of the modules may be selected according to actual needs to achieve the purpose of the solution of this embodiment. A person skilled in the art can understand and implement it without inventive effort.

Various component embodiments of the disclosure may be implemented in hardware, or in software modules running on one or more processors, or in a combination thereof. A person skilled in the art will appreciate that a microprocessor or digital signal processor (DSP) may be used in practice to implement some or all of the functions of some or all of the components of a computing processing device in accordance with embodiments of the disclosure. The disclosure may also be embodied as apparatus or device programs (e.g., computer programs and computer program products) for carrying out a portion or all of the methods described herein. Such a program implementing the disclosure may be stored on a computer-readable medium or may be in the form of one or more signals. Such signals may be downloaded from an Internet website, provided on a carrier signal, or provided in any other form.

Figure 5:
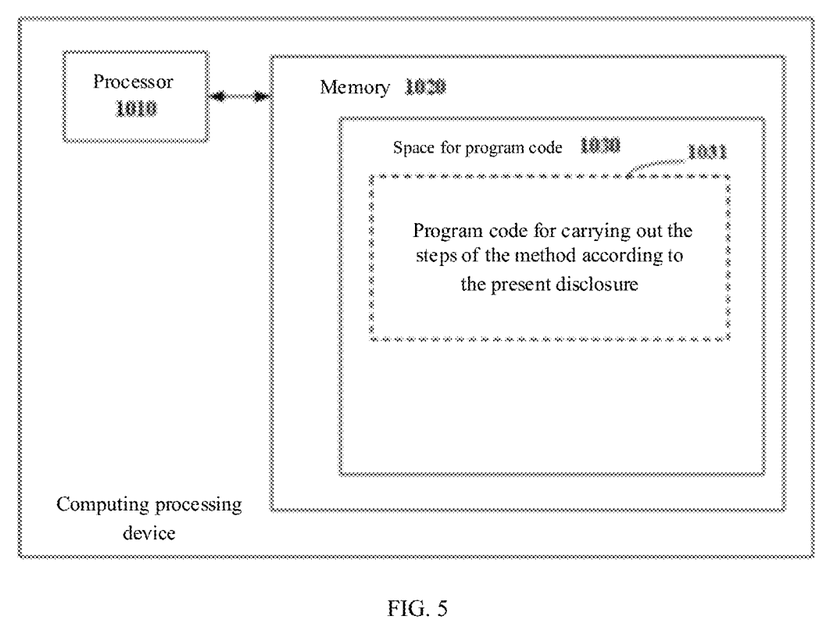
FIG. 5 schematically shows a block diagram of a computing processing device for carrying out a method according to the disclosure.
Figure 6:
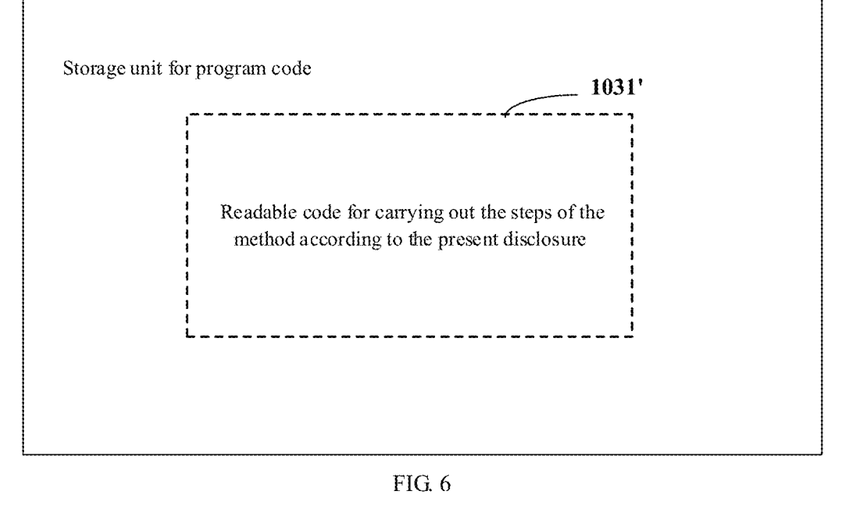
FIG. 6 schematically shows a memory unit for holding or carrying program code implementing the method according to the disclosure.

For example, FIG. 5 illustrates a computing processing device that may implement a method in accordance with the disclosure. The computing processing device conventionally comprises a processor 1010 and a computer program product or computer readable medium in the form of a memory 1020. The memory 1020 may be electronic memory such as flash memory, EEPROM (electrically erasable programmable read only memory), EPROM, hard disk, or ROM. The memory 1020 has a storage space 1030 for program code 1031 for carrying out any of the method steps described above. For example, the storage space 1030 for program code may include respective program code 1031 for implementing various steps in the above method, respectively. The program code may be read from or written to one or more computer program products. These computer program products comprise a program code carrier such as a hard disk, a compact disc (CD), a memory card or a floppy disk. Such a computer program product is typically a portable or fixed storage unit as described with reference to FIG. 6. The memory unit may have memory segments, memory space, etc. arranged similarly to memory 1020 in the computing processing device of FIG. 5. The program code may, for example, be compressed in a suitable form. Generally, the memory unit comprises computer readable code 1031', i.e., code that can be read by a processor, such as, for example, 1010, which when executed by a computing processing device, causes the computing processing device to carry out the various steps according to the methods described above.

Reference herein to "one embodiment", "an embodiment", or "one or more embodiments" means that a particular feature, structure, or characteristic described in connection with the embodiment is included in at least one embodiment of the disclosure. In addition, it is noted that instances of the word "in one embodiment" herein are not necessarily all referring to the same embodiment.

In the description provided herein, numerous specific details are set forth. However, it is understood that embodiments of the disclosure may be practiced without these specific details. In some instances, well-known methods, structures and techniques have not been shown in detail in order not to obscure the understanding of this description.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The disclosure can be implemented by means of hardware comprising several distinct elements, and by means of a suitably programmed computer. In the unit claims enumerating several means, several of these means can be embodied by one and the same item of hardware. The use of the words first, second, third, etc. does not denote any order. These words may be interpreted as names.

Finally, it should be noted that: the above examples are only intended to illustrate the technical solution of the disclosure, not to limit it; although the disclosure has been described in detail with reference to the foregoing embodiments, it should be understood by a person skilled in the art that: the technical solutions described in the foregoing embodiments may still be modified, or some technical features may be equivalently replaced; such modifications and substitutions do not depart from the spirit and scope of the technical solutions of the embodiments of the disclosure.

The invention claimed is:

1. An engine control method applied to a vehicle including a battery and an engine, wherein, the method comprises:
   by using a first acquisition processor, obtaining a current maximum discharge power value of the battery, and a current maximum external characteristic power value of the vehicle;
   by using a second acquisition processor, obtaining a current opening value and a current opening change rate of an accelerator pedal of the vehicle;
   by using a determination processor, determining a driving intention based on the current opening value and the current opening change rate; and
   by using a control processor, controlling start and stop of the engine according to the driving intention, the current maximum discharge power value, and the current maximum external characteristic power value of the vehicle;
   wherein, the vehicle is preset with an opening change rate condition; and
   wherein, by using the determination processor, the determining the driving intention according to the current opening value and the current opening change rate comprises:
      by using a first control processor, controlling the opening change rate condition to be in an active state when the current opening change rate is greater than a first preset change rate;
      by using a second control processor, controlling the opening change rate condition to be in a deactivated state when the opening change rate of the accelerator pedal is less than a second preset change rate; wherein the first preset change rate is greater than the second preset change rate;
      by using a third control processor, controlling the opening change rate condition to remain to be in the current state when the current opening change rate is less than or equal to the first preset change rate and the opening change rate of the accelerator pedal is greater than or equal to the second preset change rate;
      by using a first determination processor, determining that the driving intention is urgent if the current opening value is greater than or equal to a preset opening value and the opening change rate condition is in the active state; and
      by using a second determination processor, determining that the driving intention is non-urgent if the current opening value is less than the preset opening value and/or the opening change rate condition is in the deactivated state.

2. The engine control method according to claim 1, wherein, the controlling start and stop of the engine according to the driving intention, the current maximum discharge power value, and the current maximum external characteristic power value of the vehicle comprises:
   by using a fourth control processor, controlling the engine to start, and controlling the engine to drive the vehicle if it is determined that the driving intention is urgent and the current maximum discharge power value is less than the current maximum external characteristic power value of the vehicle.

3. The engine control method according to claim 2, wherein, the vehicle further includes a motor electrically connected to the battery, and the controlling start and stop of the engine according to the driving intention, the current maximum discharge power value, and the current maximum external characteristic power value of the vehicle further comprises:
   by using a fifth control processor, controlling the engine not to start, and controlling the battery to supply power to the motor according to a required power of the vehicle if it is determined that the driving intention is non-urgent, and/or the current maximum discharge power value is greater than or equal to a current maximum external characteristic power value of the vehicle.

4. The engine control method according to claim 2, wherein, the controlling the engine to start and controlling the engine to drive the vehicle if it is determined that the driving intention is urgent and the current maximum discharge power value is less than a current maximum external characteristic power value of the vehicle further comprises:
by using a sixth control processor, controlling the engine to drive the vehicle according to a required power and controlling the engine to charge the battery when an output power of the engine is greater than the required power of the motor.

5. The engine control method according to claim 4, wherein, after the engine required power is controlled to drive the vehicle and the engine is controlled to charge the battery when the output power of the engine is greater than the required power of the vehicle, it further comprises:
by using a seventh control processor, controlling the engine to enter into a stopped state if a current charge state value of the battery is greater than or equal to a first preset charge threshold.

6. An engine control system applied to a vehicle including a battery and an engine, wherein, the system comprises:
a first acquisition processor for obtaining a current maximum discharge power value of the battery, and a current maximum external characteristic power value of the vehicle;
a second acquisition processor for obtaining a current opening value and a current opening change rate of an accelerator pedal of the vehicle;
a determination processor for determining a driving intention based on the current opening value and the current opening change rate; and
a control processor for controlling start and stop of the engine according to the driving intention, the current maximum discharge power value, and the current maximum external characteristic power value of the vehicle;
wherein, the vehicle is preset with an opening change rate condition; and
wherein the determination processor comprises:
a first control processor for controlling the opening change rate condition to be in an active state when the current opening change rate is greater than a first preset change rate;
a second control processor for controlling the opening change rate condition to be in a deactivated state when the opening change rate of the accelerator pedal is less than a second preset change rate;
wherein the first preset change rate is greater than the second preset change rate;
a third control processor for controlling the opening change rate condition to remain to be in the current state when the current opening change rate is less than or equal to a first preset change rate and the opening change rate of the accelerator pedal is greater than or equal to a second preset change rate;
a first determination processor for determining that the driving intention is urgent if the current opening value is greater than or equal to a preset opening value and the opening change rate condition is in the active state; and
a second determination processor for determining that the driving intention is non-urgent if the current opening value is less than the preset opening value and/or the opening change rate condition is in the deactivated state.

7. The engine control system according to claim 6, wherein, the vehicle further includes a motor connected to the battery;
wherein the control processor comprises:
a fourth control processor for controlling the engine to start, and controlling the engine to drive the vehicle if it is determined that the driving intention is urgent and the current maximum discharge power value is less than the current maximum external characteristic power value of the vehicle.

8. A vehicle, comprising the engine control system according to claim 6.

9. A computing processing device, characterized by comprising:
a memory in which a computer readable code is stored;
wherein when the computer readable code is executed by the computing processing device, the computing processing device is configured to, carry out the engine control method according to claim 1.

10. A non-transitory computer-readable medium having computer readable code stored thereon which, when executed by a processor causes the processor to carry out the engine control method according to claim 1.

11. The vehicle according to claim 8, wherein the vehicle further includes a motor connected to the battery;
wherein the control processor comprises:
a fourth control processor for controlling the engine to start, and controlling the engine to drive the vehicle if it is determined that the driving intention is urgent and the current maximum discharge power value is less than the current maximum external characteristic power value of the vehicle.

* * * * *